(12) United States Patent
Van Lith et al.

(10) Patent No.: US 6,524,220 B2
(45) Date of Patent: Feb. 25, 2003

(54) CONTINUOUSLY VARIABLE TRANSMISSION HAVING A VARIABLE TRANSMISSION RATIO COVERAGE

(75) Inventors: Johannes Hendrikus Van Lith, Berlicum (NL); Cornelis Johannes Van Der Meer, Tilburg (NL)

(73) Assignee: Van Doorne's Transmissie B.V., Tilburg (NL)

(*) Notice: Subject to any disclaimer, the term of this patent is extended or adjusted under 35 U.S.C. 154(b) by 0 days.

(21) Appl. No.: 09/846,239

(22) Filed: May 2, 2001

(65) Prior Publication Data

US 2001/0039231 A1 Nov. 8, 2001

(30) Foreign Application Priority Data

May 3, 2000 (EP) .............................................. 00201591

(51) Int. Cl.[7] .............................................. B60K 41/12
(52) U.S. Cl. ........................................... 477/44; 477/46
(58) Field of Search ............................... 477/34, 37, 38, 477/44, 45, 46, 48, 50

(56) References Cited

U.S. PATENT DOCUMENTS

| | | | | |
|---|---|---|---|---|
| 4,767,382 A | * | 8/1988 | Tezuka et al. ................ | 474/28 |
| 5,178,044 A | * | 1/1993 | Suzuki et al. ................ | 474/18 |
| 5,337,628 A | * | 8/1994 | Hendriks et al. ......... | 251/129.07 |
| 5,431,602 A | * | 7/1995 | Hendriks et al. ......... | 251/129.08 |
| 5,688,204 A | | 11/1997 | Runge et al. | |
| 5,885,186 A | * | 3/1999 | Van Wijk et al. ............. | 477/43 |
| 5,890,991 A | * | 4/1999 | Sakakiyama ................. | 477/46 |
| 5,928,301 A | * | 7/1999 | Soga et al. ................... | 477/31 |
| 5,971,887 A | * | 10/1999 | Hattori et al. ................ | 477/41 |
| 6,033,339 A | * | 3/2000 | Aberson et al. .............. | 477/46 |
| 6,066,069 A | * | 5/2000 | Vorndran ..................... | 477/38 |
| 6,086,506 A | * | 7/2000 | Petersmann et al. ......... | 477/45 |
| 6,188,946 B1 | * | 2/2001 | Suzuki et al. ................. | 477/46 |
| 6,358,181 B1 | * | 3/2002 | Friedmann et al. .......... | 477/37 |
| 6,408,239 B2 | * | 6/2002 | Bacher et al. ................ | 701/67 |
| 6,409,627 B2 | * | 6/2002 | Bolz et al. .................... | 477/46 |

FOREIGN PATENT DOCUMENTS

| | | |
|---|---|---|
| DE | 27 52 322 | 6/1978 |
| DE | 41 06 471 | 8/1991 |
| EP | 0 767 324 | 4/1997 |

* cited by examiner

Primary Examiner—Richard M. Lorence
Assistant Examiner—David D. Le
(74) Attorney, Agent, or Firm—Young & Thompson

(57) ABSTRACT

A continuously variable transmission includes a primary pulley, a secondary pulley, a drive belt wrapped around the pulleys at a variable radial position between discs of each pulley and a transmission control part for controlling a transmission torque ratio between a maximum and a minimum value (Rmax, Rmin), whose quotient defines a transmission ratio coverage, which is variable in dependence on the rotational speed of the primary pulley.

15 Claims, 2 Drawing Sheets

CONTINUOUSLY VARIABLE TRANSMISSION HAVING A VARIABLE TRANSMISSION RATIO COVERAGE

BACKGROUND OF THE INVENTION

The present invention relates to a continuously variable transmission, comprising:
- a primary pulley for rotating at a rotational speed;
- a secondary pulley, whereby a drive belt is wrapped around said pulleys at variable radial positions; and
- a transmission control means for controlling the transmission ratio between a maximum and a minimum value, whose quotient defines a transmission ratio coverage at least in relation to a rotational speed of the primary pulley.

The present invention also relates to a method for controlling the transmission ratio accordingly.

DESCRIPTION OF THE RELATED ART

Such a continuously variable transmission is disclosed in EP-A-0 767 324. In particular it is known therefrom, to have transmission control means influence the actual transmission ratio within a ratio control area. The transmission speed ratio is known to be defined as the quotient between the bending radius of the drive belt when running around said secondary pulley and the bending radius of the drive belt running around said primary pulley. The ratio control area is defined in a so called variogram, which is a graphical representation of the primary pulley rotational, or input speed, which is usually equal to the engine speed, and the secondary pulley rotational, or output speed, which apart from the presence of reduction means may be considered to represent the vehicle speed. The currently generally adopted ratio control area in the variogram (see FIG. 2) is a limited area surrounded by a maximum input speed Nin, a maximum output speed Nout, a straight line indicating the maximum transmission torque ratio Rmax (=the lowest speed transmission ratio, i.e. Low) and a straight line indicating the minimum transmission torque ratio Rmin (=the highest speed transmission gear, i.e. overdrive Od). The actual transmission ratio can be controlled to lie within the ratio control area, whereby Rmax and Rmin, respectively Low and OD are extreme transmission ratios, whose quotient in the known continuously variable transmission defines a fixed transmission ratio coverage value. At realising a transmission design these extreme transmission ratios usually defined by determining the smallest radial positions of the drive belt attainable for both the primary and the secondary pulley such that during operation a load on the drive belt does not exceed an empirically determined maximum load value, which positions together with a desired distance between the rotational centres of the pulleys, i.e. the transmission size, determine the above-mentioned extreme transmission ratios and thus its transmission ratio coverage value. Hereby, the smallest radial position of the drive belt for the primary pulley is determined by the maximum attainable primary pulley input speed that is usually related to a maximum speed of an engine driving a load through the transmission, whereas the smallest radial position of the drive belt for the secondary pulley is determined by the maximum attainable secondary pulley output speed that is usually related to a maximum rotational speed of a load, e.g. passenger vehicle, driven by the engine through the transmission. The maximum rotational speed of the load thereby being determined by an equilibrium between a mechanical power generated by the engine and a mechanical power needed to sustain the rotational speed of the load, e.g. to overcome resistance factors such as a wind and a rolling resistance.

Within the nowadays available electronically controlled continuously variable transmissions full use of the transmission possibilities is made, whereby its application parameters however lie within the strictly bounded above-mentioned ratio control area.

SUMMARY OF THE INVENTION

It is an aim of the present invention to further extend the possibilities of a continuously variable transmission i.e. to break through the above-mentioned boundaries, in particular to extend the application and control possibilities of the prior art transmissions.

Thereto the continuously variable transmission according to the present invention is characterised in that the transmission control means are arranged for controlling said transmission ratio such that the transmission ratio coverage varies in relation to the rotational speed of the primary pulley.

Surprisingly it has been found that there is no absolute need to confine the transmission ratio control in relation to the rotational speed of the primary pulley to a transmission ratio control coverage having a fixed value. It has been found that a variable transmission ratio coverage from a point of view of the drive belt may vary and need not have a fixed value. This per se is a break through opening new and further application possibilities for continuously variable transmissions, in particular at the now extended outer limits of the control at minimum (high gear, i.e. overdrive Od) transmission speed ratio and/or maximum (low gear, i.e. Low) transmission speed ratio. This increases the area of the known ratio control area, hence extending the application possibilities and control limits of the transmission according to the invention.

It is an important aspect of the present invention that the total mechanical tension Ttotal in the drive belt, apart from other less significant tension components, is at least determined by a torque tension Tbelt related to the torque transmitted by the drive belt, a bending tension Tbend related to the amount of bending imposed on the drive belt when it runs around the primary and secondary pulleys, e.g. as quantified by the respective running radius, and a centrifugal tension Tcentr. related to centrifugal forces acting on the belt as a result of the drive belt speed and bending. It holds roughly that:

$$T\text{total} = T\text{belt} + T\text{bend} + T\text{centr.}$$

It may be noted that the mechanical tension Ttotal in the drive belt during operation must be limited to a boundary value to prevent premature failure of the belt, for example due to fatiguing in case of a metallic drive belt, such boundary value conforming to the said maximum load value.

According to an important notion of the present invention Tbend may vary, and in particular be made dependent on the combined influence of Tbelt and Tcentr. without exceeding said above mentioned boundary value of Ttotal.

As for the drive belt speed, the centrifugal tension Tcentr. depends on the cubic of the drive belt speed. Since the belt speed depends on the rotational speed of the primary pulley and the transmission ratio through the belt's radial position at, at such lowered speeds the cubic thereof is lowered even more, and therefore that allowable amount of bending and the bending tension Tbend resulting therefrom may be increased without Ttotal exceeding said boundary value. Hence, for a relatively low rotational speed of the primary pulley, the maximum transmission speed ratio (low gear) may be increased and/or the minimum transmission speed ratio (high gear) may be decreased, by reducing the smallest radial position of the drive belt for the primary pulley and/or the secondary pulley respectively, thus widening the allowable ratio control area with respect to that at a relatively high rotational speed of the primary pulley.

As for the torque tension Tbelt, it is usually true that said torque tension increases with increasing speed of the primary pulley at least up to a certain speed of said pulley, as a result of the engine speed/torque characteristic of an engine driving said primary pulley. Because of this the allowable amount of bending of the drive belt and the bending tension Tbend resulting therefrom may be increased even further above said certain speed without the total mechanical tension Ttotal exceeding said boundary value, at least for relatively low rotational speed of the primary pulley. It is however noted that the torque transmitted is only directly dependent on the speed of the primary pulley, if there is a fixed connection between the engine and the primary pulley. The fixed connection usually exists when the transmission is in high gear, but in low gear it is common practice to adopt a slipping clutch or torque converter between engine and primary pulley, so that the engine speed may be considerably larger than the speed of the primary pulley.

It may thus be concluded that an increase in the allowable amount of bending due to a reduced amount of transmitted torque is primarily useful for reducing the minimum transmission ratio. As a consequence, at speeds lower than a primary pulley speed conforming to the maximum secondary speed attainable in high gear, the amount of bending of the drive belt may be increased and thus the smallest radial position thereof may be even smaller to break through the boundary of a fixed transmission ratio coverage to reveal said variable transmission ratio coverage having extended application possibilities.

The above is particularly relevant in case of a push-type drive belt, e.g. known from EP-A-0588416, which comprises one or more endless metallic rings, i.e. carriers, that support a number of plate like metallic elements slideably provided on the rings along its entire circumference. This type of drive belt has the advantage that torque may be transmitted by the elements pushing each other forward along the circumference of the rings, the tension in the rings required to transmit a given amount of torque is hereby greatly reduced. Although this type of drive belt has superior mechanical characteristics when compared to a pull type drive belt without said slideably provided elements, it also has the disadvantage that, due to the presence of the elements, the belt is rather heavy. Hence, the mechanical tension due to the centrifugal forge is significant even at a relatively low drive belt speed. Accordingly, the allowable amount of bending in the transmission according to the invention thus increases sharply with decreasing speed of the primary pulley, whereby the ratio coverage of a transmission provided with the push-type drive belt may be improved considerably.

The above means that the driving-off performance can be improved, in case the dimensions and strength of the generally hydraulic control part of the control means are devised accordingly, because the maximum transmission speed ratio can be increased, as long as a critical allowable primary pulley speed is not reached. In addition, a smaller minimum, or overdrive transmission speed ratio reduces the fuel consumption relative to the prior art transmissions by lowering the engine speed at a given vehicle speed.

A particular embodiment of the transmission according to the invention is characterised that the transmission control means are arranged to control said transmission ratio such that either one or both of a maximum and a minimum attainable transmission ratio varies. Advantageously at wish, either the traction characteristics at high transmission ratios, and/or the characteristics at high speeds of a vehicle provided with the continuously variable transmission may be improved by extending the prior fixed extreme transmission ratios to variable ratios.

A further embodiment of the transmission according to the invention has the characterising feature that the transmission control means are arranged to control said transmission ratio such that the transmission ratio coverage decreases in relation to an increasing rotational speed of the primary pulley.

It is an advantage of the continuously variable transmission according to the invention that in particular the extend wherein the prior art transmission ratio limits are offset may be influenced in dependence on, and at wish in conjunction with the engine or primary pulley speed, in order to comply even better with ever increasing driving and comfort demands.

A still further embodiment of the transmission according to the invention is characterised in that the variable transmission ratio coverage is controlled such that the outer limits of its maximum and/or minimum transmission ratios in a variogram are such that their course is one of: a curved (continuous) course or a (discontinuous) course showing a stepwise change, the position of which change in a variogram showing the relation between the primary pulley rotational speed and the secondary pulley rotational speed, may be related to the speed of a vehicle provided with such a transmission.

It is advantage of the transmission according to the invention that at wish the course of the newly devised extended boundaries, i.e. the new maximum and minimum transmission speed ratios, can be controlled easily.

Advantageously in still another embodiment of the transmission according to the invention, the stepwise change is positioned at a vehicle speed value of approximately 100 to 140 km/h. preferably at a vehicle speed value within the range of 110 to 130 km/h.

Preferably, in a following embodiment of the invention, the transmission control means are programmable control means. This provides addition flexibility to the course of the control of the transmission ratio.

Further preferred embodiments and related subjects of the present invention are specified in the remaining claims and sub-claims.

BRIEF DESCRIPTION OF THE DRAWINGS

At present the continuously variable transmission, methods and related subjects according to the invention will be elucidated further together with their additional advantages while reference is being made to the appended drawing. In the drawing.

DESCRIPTION OF THE PREFERRED EMBODIMENTS

Figure 1:
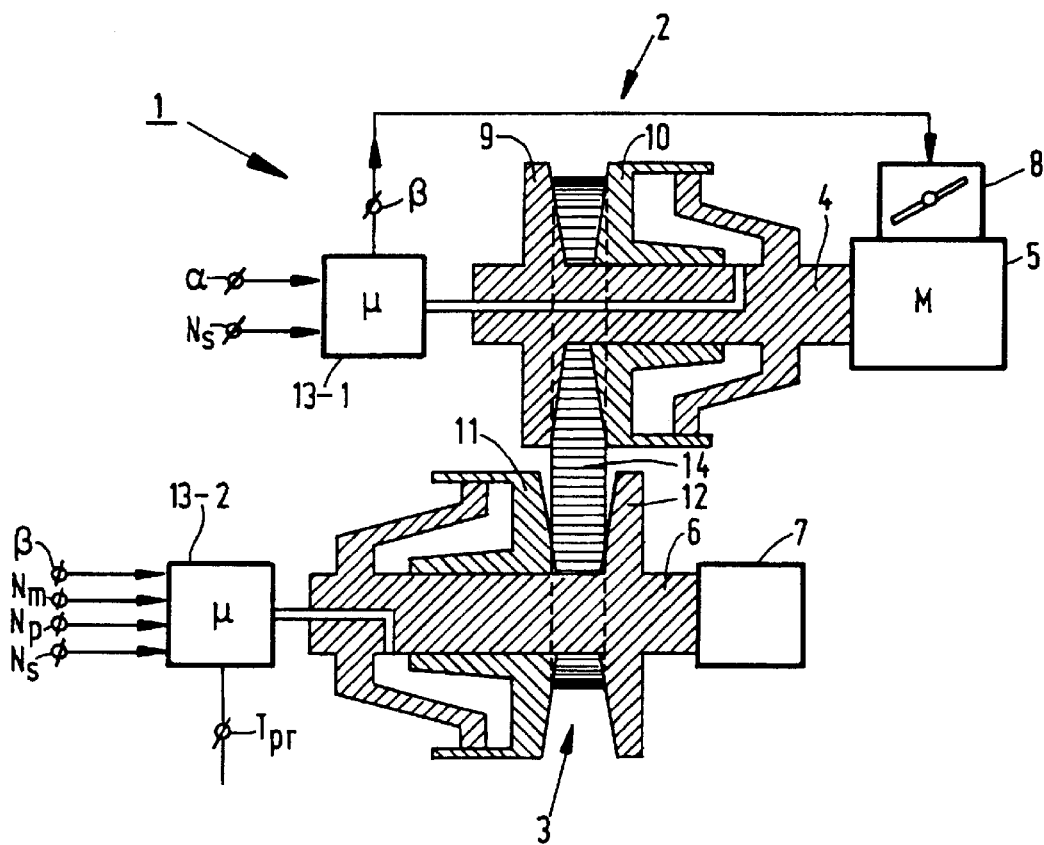
FIG. 1 shows a schematic diagram of a relevant part of the continuously variable transmission according to the present invention.

FIG. 1 shows an embodiment of a continuously variable transmission 1 of a type comprising a primary pulley 2—generally the drive side pulley—and a secondary pulley 3—generally the driven side pulley. The primary pulley 2 has a drive shaft 4 coupled to an engine 5, and the secondary pulley 3 has a driven shaft 6 coupled to a load process 7, generally, but no necessarily wheels of a vehicle (not shown). The engine 5 is provided with a throttle valve 8 whereto a throttle control signal $\beta$ is applied. The pulleys 2 and 3 are each provided with discs 9, 10 and 11, 12 respectively. Generally, two of these, e.g. discs 10 and 11, are displaceable along their respective shafts 4 and 6.

Displacement takes place by transmission control means 13, here hydraulic control means in order to influence the radial positions of an endless transmission means/element or drive belt 14 wrapped between the pairs of discs 9, 10 and 11, 12 respectively, the so-called bending radii. In the case as shown the transmission control means comprise separate control means 13-1 for the primary pulley 2 and separate control means 13-2 for the secondary pulley 3. The transmission control means 13 are preferably programmable control means a variety of control signals fed to the electronic control means 13, such as for example a vehicle accelerator pedal signal $\alpha$, a signal Ns which represents the rotational speed of the secondary pulley 3, a signal Np which represents the rotational speed of the primary pulley 2, a signal Nm which represents the rotational speed of the engine 5, if this speed differs from the primary pulley speed, and the throttle signal $\beta$, which is possibly generated based on knowledge about inter alia the signals $\alpha$ and Ns. The drive belt 14 transmits a driving torque from the engine 5 to the load process or vice versa. The control of the transmission ratio in the transmission 1 can be visualised by means of a variogram.

Figure 2:
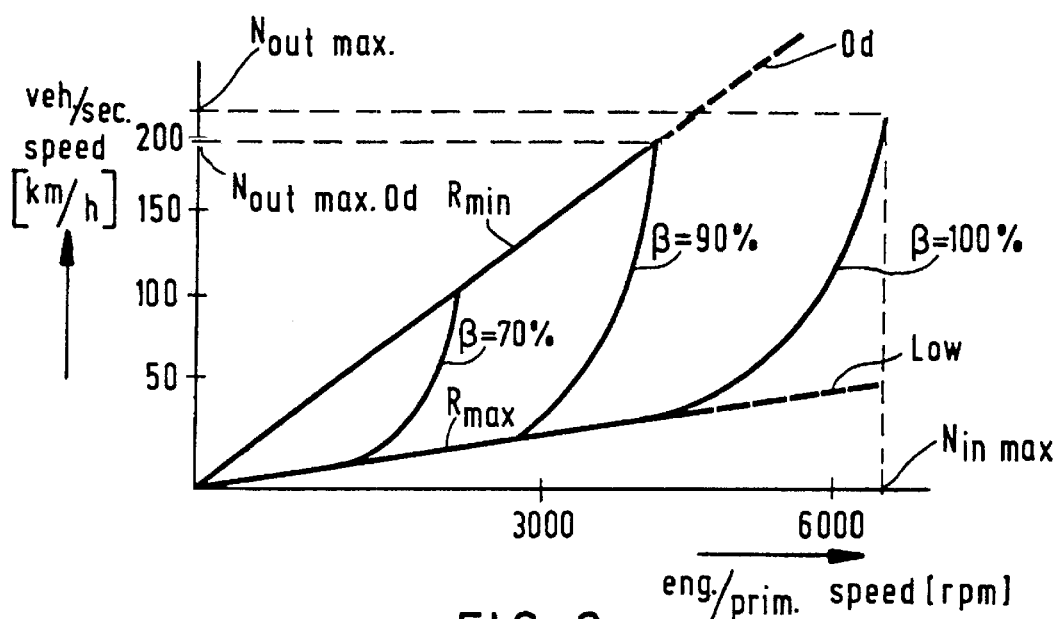
FIG. 2 shows a variogram of a continuously variable transmission according to the prior art.
Figure 3:
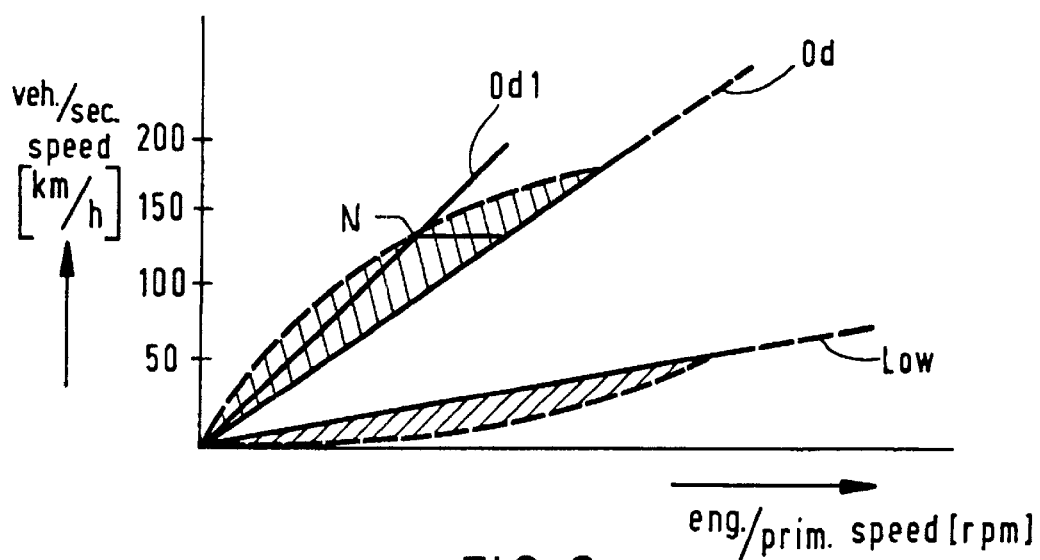
FIG. 3 shows a graph of a variogram of a continuously variable transmission according to the present invention.

FIGS. 2 and 3 show respective graphs of variograms, wherein the vehicle or secondary pulley speed is plotted against the engine or primary pulley speed, each straight line intersecting the origin of the graph thus representing a transmission speed ratio. The area wherein the transmission ratio of the transmission 1 is controlled is bounded by virtual lines of a maximum engine speed Nin max, a maximum vehicle speed Nout max (whose speed value varies in practice depending on i.e. the driving and road resistance conditions) and by the minimum and the maximum transmission speed ratio limits, here indicated as Low or Rmax and Od (overdrive) or Rmin respectively, which are determined by the layout or hardware of the transmission of FIG. 1 including the drive belt 14. In turn these values are determined by parameters, such as maximum allowable tensions in the drive belt, the maximum allowable bending tension and other empirical parameters,. in such a manner that during operation of the transmission in each of such maximum and minimum transmission speed ratio the load on the drive belt does not exceed an empirically determined maximum load value. Within the thus defined control area, FIG. 2 shows possible control lines whereon the throttle valve signal $\beta$ has some exemplified values. The graph of FIG. 2 further indicates the usually present feature that the maximum vehicle speed attainable in Od speed ratio Nout max Od is noticeably smaller than the maximum vehicle speed attainable overall Nout max. The latter is usually achieved at a transmission torque ratio larger than Rmin, i.e. a transmission speed ratio slightly smaller than high gear or Od, and is the direct result of an engine speed-engine torque characteristic of the engine 5 driving the load 7.

It appears that centrifugal forces acting on the belt as a function of its speed and bending radius influence the total mechanical tension in the drive belt which latter tension contributes to the load thereon. The centrifugal forces show a squared dependency on the drive belt speed. This means that at speeds lower than a maximum belt speed attainable during operation the aforementioned torque and/or bending tensions may be increased without exceeding the empirically determined maximum load value of the drive belt. This "trade-off" can be used efficiently by allowing the Low and Od lines to bulge out outside of their usual limits. The thus created extended control area is hatched in the variogram of FIG. 3. Due to this extended control area the quotient of the maximum and minimum transmission ratio is no longer a fixed value in relation to the engine speed, but it may vary. By allowing the control means 13-1, 13-2 to accordingly use this extended control area new application possibilities arise. Of course the layout or hardware of the transmission 1 has to be devised accordingly too. In particular the transmission has to allow control in this extended control area, and a larger variation of bending radii of the drive belt 14 between the pulleys 2, 3 has to be made possible.

In particular one or both of the LOW and Od lines in the variogram may be used separately for extended transmission ratio control. Possible courses of maximum or minimum transmission ratio control outside the prior art straight lines are shown in FIG. 3 as a broken line (continuous) course, or a stepwise (discontinuous) course. The continuous course shown in FIG. 3 may for instance be determined such that in a range of engine speed values the total load on the drive belt 14 is essentially constant and preferably equal to the maximum allowable load value in which case a maximum ratio coverage is realised. A disadvantage of this latter approach is that the transmission 1 must be adapted, i.e. enlarged, to accommodate such a maximally extended control area. However, the maximum extension is possible at the lowest primary pulley speed occurring during operation, because the ratio coverage defined between the broken lines continuously decreases with such speed. Therefore, the invention further suggest an embodiment as illustrated in FIG. 3 where an extended overdrive line Od1 shows a stepwise change N to the known overdrive line Od. In this case the maximum ratio coverage to which the transmission hardware is adapted is advantageously maintained over a relatively large range of engine speeds, realising a particular effective embodiment of the invention where the gain in ratio coverage and the additional cost of the transmission hardware may be optimally balanced. It is remarked here that the invention is characterised by the feature that although a physically allowed ratio coverage of the transmission 1 is in principal fixed and defined by the transmission hardware, indeed the control means 13 is arranged such that the transmission ratio is controlled inside a range of transmission ratios attainable during normal operation of the transmission 1 that varies in relation to the rotational speed of the primary pulley 2 so as to prevent the load on the drive belt 14 to exceed the maximum load value. So, as an example, although the transmission 1 is theoretically physically capable of realising the highest possible gear Od1 even at the highest rotational speeds of the primary pulley 2, the control means is in fact arranged such at such highest speeds the transmission ratio such highest possible gear Od1 is not attained, but in fact bound by the Od curve to prevent the load on the drive belt 14 from exceeding the said maximum value.

The position of the stepwise change N in the variogram preferably lies between 100–140 km/h, more preferably between 110 and 130 km/h. The smallest now feasible transmission torque ratio is smaller than that feasible in the prior art, which improves the fuel consumption, at least at vehicle speeds below the speed value of the stepwise change N. Above say 120 km/h the fuel consumption is high anyhow.

Of course, similar extending possibilities also apply to the Low side in the variogram outside the normally straight Low line. The control means 13-1 and/or 13-2 may be provided with a programmable microprocessor μ with associated peripheral devices such as memory for storing a program therein, in order to perform the transmission control method accordingly. Of course several variations and modifications are possible when reducing the presently explained concept, process and strategy to a practical form of realisation, when it comes to the continuously variable transmission applied in a load process or in certain types of vehicles.

What is claimed is:

1. A continuously variable transmission (1) comprising:
   a primary pulley (2) for rotating at a rotational speed;
   a secondary pulley (3), whereby a drive belt (14) is wrapped around said pulleys (2; 3) at variable radial positions their quotient defining a transmission ratio of the transmission; and
   a transmission control means (13) for controlling the transmission ratio between a maximum and a minimum value, whose quotient defines a transmission ratio coverage,
   wherein, the transmission control means (13) is arranged for controlling said transmission ratio such that the transmission ratio coverage varies in relation to the rotational speed of the primary pulley,
   the transmission control means (13) is arranged to control the transmission ratio such that the transmission ratio coverage decreases in relation to an increasing rotational speed of the primary pulley (2), and
   the transmission control means maintains a ratio control range smaller than a physically attainable ratio range during all times of transmission operation.

2. The continuously variable transmission (1) according to claim 1, wherein the transmission control means (13) is arranged to control the transmission ratio such that either one or both of a maximum and a minimum attainable transmission ratio varies.

3. The continuously variable transmission (1) according to claim 1, characterised in that the transmission control means (13) are programmable control means.

4. Vehicle provided with a continuously variable transmission according to claim 1.

5. The continuously variable transmission (1) according to claim 1, wherein the transmission control means (13) is arranged to control the transmission ratio such that the course of one of a maximum and a minimum attainable transmission ratio varies in relation to the rotational speed of the primary pulley (2) is one of a continuously curved course and a discontinuous course showing a stepwise change (N).

6. The continuously variable transmission (1) according to claim 5, wherein the position of the stepwise change (N) in a variogram defining the relation between the primary pulley speed and the secondary pulley speed for the transmission (1), is related to the speed of a vehicle provided therewith.

7. The continuously variable transmission (1) according to claim 6, wherein the stepwise change (N) is positioned at a vehicle speed of approximately 100–140 km/h.

8. The continuously variable transmission (1) according to claim 6, wherein the stepwise change (N) is positioned at a vehicle speed of approximately 111–130 km/h.

9. A method for controlling the transmission ration in a continuously variable transmission (1) comprising
   a primary pulley (2) for rotating at a rotational speed;
   a secondary pulley (3), whereby a drive belt (14) is wrapped around said pulleys (2; 3) at variable radial positions their quotient defining a transmission ratio of the transmission; and
   a transmission control means (13) for controlling the transmission ratio between a maximum and a minimum value, whose quotient defines a transmission ratio coverage,
   wherein, the transmission control means (13) is arranged for controlling said transmission ratio such that the transmission ratio coverage varies in relation to the rotational speed of the primary pulley,
   the transmission control means (13) is arranged to control the transmission ratio such that the transmission ratio coverage decreases in relation to an increasing rotational speed of the primary pulley (2), and
   the transmission control means maintains a ratio control range smaller than a physically attainable ratio range during all times of transmission operation, comprising:
      the step of controlling the transmission ratio between a maximum and a minimum value, whose quotient defines a transmission ratio coverage, by varying the transmission ratio coverage in dependence on the rotational speed of the primary pulley.

10. A continuously variable transmission (1) comprising:
    a primary drive pulley (2) for rotating at a rotational speed;
    a secondary driven pulley (3);
    a drive belt (14) wrapped around said primary pulley and said secondary pulley (2; 3) at variable radial positions,
    a transmission ratio of the transmission being defined by a quotient of a running radii of the primary pulley and the secondary pulley; and
    a transmission control means (13) controlling the transmission ratio between a maximum value and a minimum value, a quotient of the maximum and minimum values defining a transmission ratio coverage,
    wherein the transmission control means (13) is arranged for controlling said transmission ratio such that
      the transmission ratio coverage varies in relation to the rotational speed of the primary pulley over the entire speed range of the primary pulley,
      either one or both of a maximum and a minimum attainable transmission ratio varies, and
      the transmission ratio coverage decreases in relation to an increasing rotational speed of the primary pulley (2) so that the transmission is maintained at less than a physically attainable ratio at all times of transmission operation.

11. The continuously variable transmission (1) according to claim 10, wherein, the transmission control means (13) is arranged to control the transmission ratio such that the course a maximum attainable transmission ratio varies in relation to the rotational speed of the primary pulley in a continuously curved course with a stepwise change (N).

12. The continuously variable transmission of claim 11, wherein the course of the maximum attainable transmission ratio varies in relation to the rotational speed of the primary pulley in a continuously curved course after the stepwise change (N) based on the curved course being to prevent the load on the drive belt from exceeding the a maximum belt load value.

13. The continuously variable transmission (1) according to claim 11, wherein the position of the said stepwise change (N) in a variogram defining the relation between the primary pulley speed and the secondary pulley speed for the transmission (1), is related to the speed of a vehicle provided therewith.

14. The continuously variable transmission (1) according to claim 13, wherein the stepwise change (N) is positioned at a vehicle speed value of approximately 100–140 km/h.

15. The continuously variable transmission (1) according to claim 13, wherein the stepwise change (N) is positioned at a vehicle speed value of approximately 110 to 130 km/h.

* * * * *